US008534338B2

(12) United States Patent
Oldani et al.

(10) Patent No.: US 8,534,338 B2
(45) Date of Patent: Sep. 17, 2013

(54) FIBER DELIVERY APPARATUS AND SYSTEM HAVING A CREEL AND FIBER PLACEMENT HEAD WITH POLAR AXIS OF ROTATION

(75) Inventors: Tino Oldani, Rockford, IL (US); Klaus Hoffmann, Rockford, IL (US); William R. Dent, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 354 days.

(21) Appl. No.: 12/905,337

(22) Filed: Oct. 15, 2010

(65) Prior Publication Data
US 2012/0090788 A1 Apr. 19, 2012

(51) Int. Cl.
*B29C 70/38* (2006.01)

(52) U.S. Cl.
USPC ............ 156/433; 156/441; 156/523; 156/573

(58) Field of Classification Search
USPC .......................... 156/425, 441, 523, 573, 433
See application file for complete search history.

(56) References Cited

U.S. PATENT DOCUMENTS

| 4,068,536 | A | * | 1/1978 | Stackhouse ...................... 74/417 |
| 4,520,530 | A | | 6/1985 | Pinto |
| 4,557,790 | A | | 12/1985 | Wisbey |
| 4,907,754 | A | | 3/1990 | Vaniglia |
| 4,909,880 | A | | 3/1990 | Kittelson et al. |
| 4,943,338 | A | * | 7/1990 | Wisbey ........................ 156/433 |
| 5,022,952 | A | | 6/1991 | Vaniglia |
| 5,223,072 | A | | 6/1993 | Brockman et al. |
| 5,584,621 | A | | 12/1996 | Bertsche et al. |
| 5,651,850 | A | | 7/1997 | Turner et al. |
| 5,698,066 | A | | 12/1997 | Johnson et al. |
| 5,761,965 | A | | 6/1998 | Dahlquist |
| 6,026,883 | A | | 2/2000 | Hegerhorst et al. |
| 6,096,164 | A | | 8/2000 | Benson et al. |
| 6,544,367 | B1 | | 4/2003 | Fujimoto et al. |
| 6,968,883 | B2 | | 11/2005 | Torres Martinez |
| 7,353,853 | B2 | | 4/2008 | Borgmann et al. |

(Continued)

FOREIGN PATENT DOCUMENTS

| EP | 0198744 A1 | 10/1986 |
| EP | 1342555 A1 | 3/2003 |

(Continued)

OTHER PUBLICATIONS

Three-Axes Wrist Drive; Publication; Dec. 1, 1984; pp. 4103-4104; IBM Technical Disclosure Bulletin; US.

*Primary Examiner* — Jeff Aftergut
(74) *Attorney, Agent, or Firm* — Reinhart Boerner Van Deuren P.C.

(57) ABSTRACT

A fiber placement system including positioner and a fiber delivery apparatus having a creel assembly and a fiber placement head is provided. The positioner moves the entire fiber delivery apparatus including the creel assembly and the fiber placement head via at least three linear degrees of freedom. The fiber delivery apparatus includes an articulating wrist for moving the fiber placement head relative to the creel assembly. The fiber placement apparatus is substantially free of linear degrees of freedom within the fiber tow paths between the spools and the fiber placement head. One or more rotational degrees of freedom may be provided along the tow path. In one embodiment, the interface between the fiber delivery apparatus and the positioner is laterally offset such that a portion of the creel axially overlaps with vertical ram of the positioner.

14 Claims, 13 Drawing Sheets

(56) References Cited

U.S. PATENT DOCUMENTS

| | | |
|---|---|---|
| 7,467,782 B2 | 12/2008 | Harvey et al. |
| 7,472,736 B2 * | 1/2009 | Kisch et al. .................. 156/433 |
| 2005/0236735 A1 | 10/2005 | Oldani et al. |
| 2006/0090856 A1 | 5/2006 | Nelson et al. |
| 2006/0180264 A1 | 8/2006 | Kisch et al. |
| 2007/0029030 A1 | 2/2007 | McCowin |
| 2007/0044919 A1 * | 3/2007 | Hoffmann .................. 156/430 |
| 2007/0084960 A1 | 4/2007 | Heaney et al. |
| 2008/0295954 A1 | 12/2008 | Kisch et al. |
| 2009/0078361 A1 | 3/2009 | Kisch et al. |
| 2009/0204253 A1 | 8/2009 | Bandini et al. |
| 2010/0024964 A1 | 2/2010 | Ingram, Jr. et al. |
| 2010/0200168 A1 | 8/2010 | Oldani et al. |
| 2012/0035754 A1 | 2/2012 | Oldani |

FOREIGN PATENT DOCUMENTS

| | | |
|---|---|---|
| EP | 1342555 A1 | 9/2003 |
| EP | 1719610 A1 | 11/2006 |
| EP | 1757433 A1 | 2/2007 |
| WO | WO 2004/101413 A2 | 11/2004 |
| WO | WO 2005/105415 A2 | 11/2005 |
| WO | WO 2006/088851 A1 | 8/2006 |

* cited by examiner

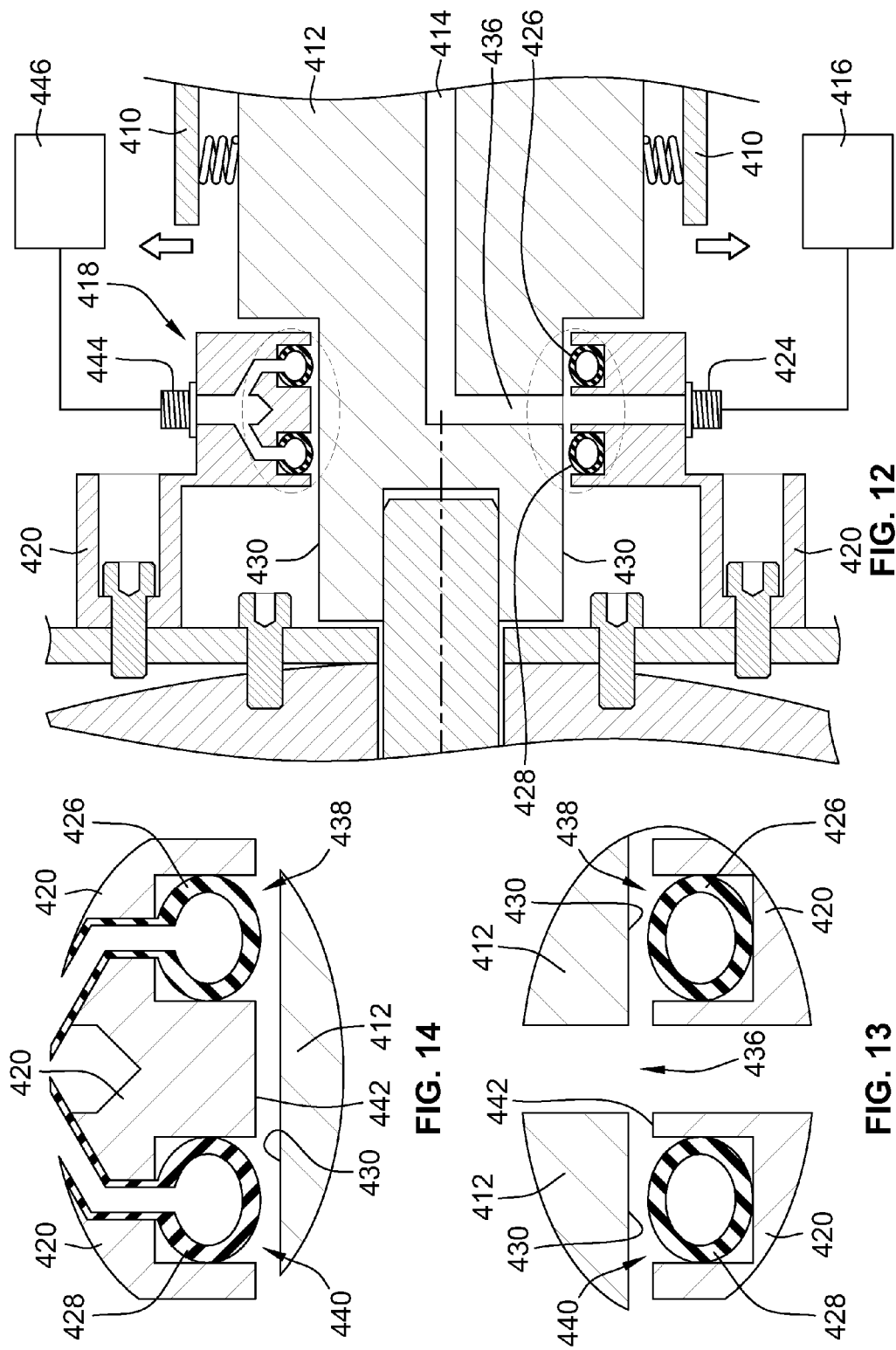

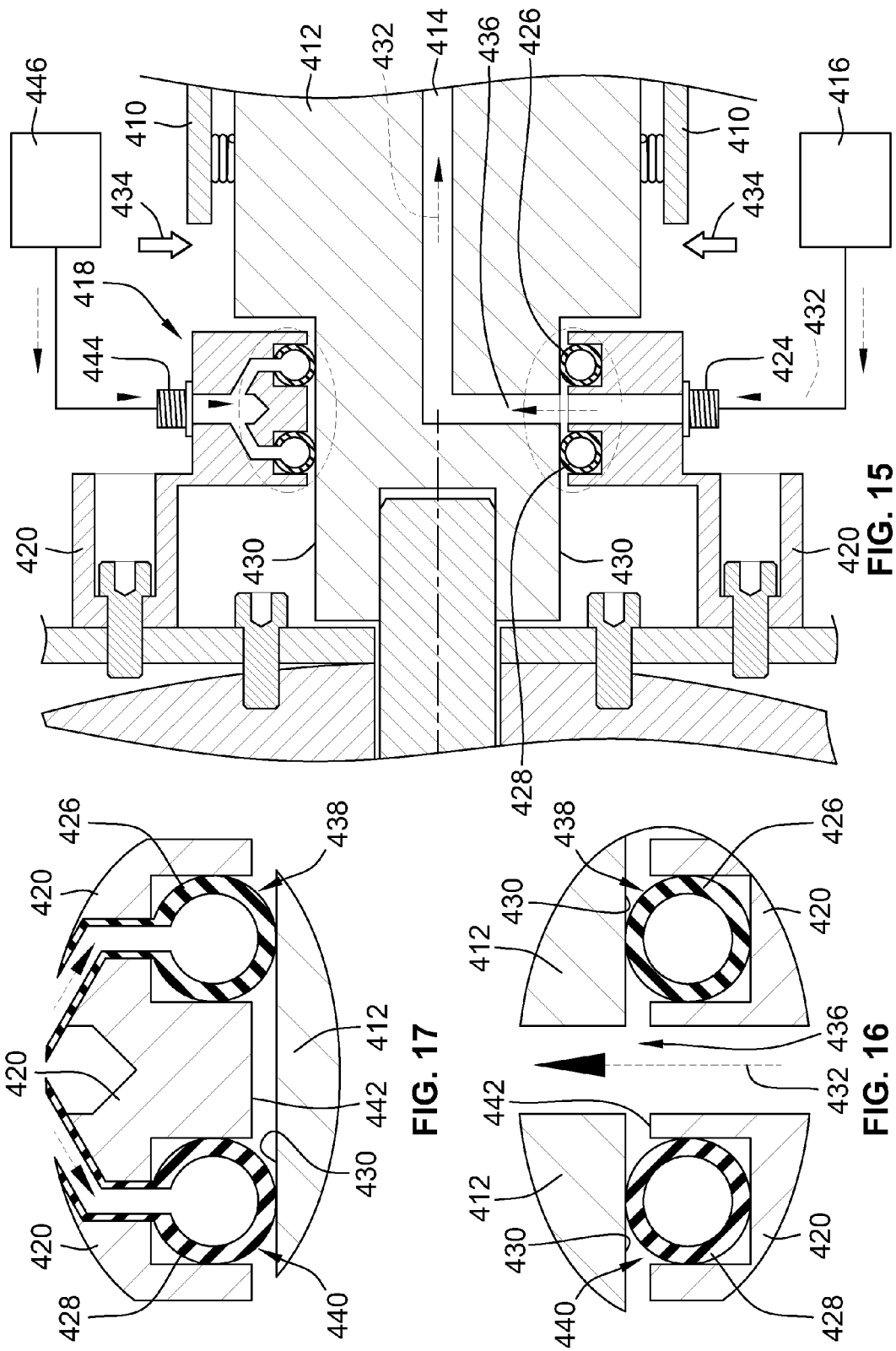

FIBER DELIVERY APPARATUS AND SYSTEM HAVING A CREEL AND FIBER PLACEMENT HEAD WITH POLAR AXIS OF ROTATION

FIELD OF THE INVENTION

This invention generally relates to automated composite fiber placement manufacturing apparatuses and methods.

BACKGROUND OF THE INVENTION

In the practice of composite fiber manufacturing, the common method has been the utilization of a plurality of thin, narrow strips of material, embedded with a variety of chemical elements, applied in repetitive applications or "lay-ups" onto a fixed or moving surface. The strips of chemically embedded material are commonly referred to as "tows" and a collection of tows in a wider, multiple tow presentation may be referred to as "tape." In either case, tow or tape applications in multiple layers and repeated lay-ups are cause for the build-up of material that, when processed through an autoclave under closely monitored and controlled atmospheric conditions, yield a solid "composite" material of substantial strength, yet light in weight.

Accordingly, composite fiber placement manufacturing relies upon a fiber placement delivery system, generally achieved through the combination of a positioning device, or "positioner," and a composite fiber tape or tow application device, which may generally be described as a "fiber application device." The portion that directly controls the placement of the fiber tape or tow may also be referred to as an fiber placement head.

The positioner moves or articulates the fiber placement head into a location based upon a three-dimensional model having arbitrary directions which require the fiber application device to have multiple degrees of orientation and positioning, relative to the tool, mold or rotatable mandrel (hereinafter generally referred to as "the tool").

During the fiber tow lay-up, the fiber placement head compresses the composite tows against the tool.

Several problems exist in the current state of the art relating to fiber placement manufacturing apparatuses and methods.

A further issue in current fiber placement manufacturing apparatuses and methods is the way that tows are prepared for lay-up within the fiber placement device prior to being used by the fiber placement head. Typically, individual tows are stored on spools located in a climate controlled creel. A layer of backing sheet separates the layers of fiber as they are wound around the spool. As the fiber is dispensed from the spool, in some systems, the backing sheet is removed from the fiber.

Unfortunately, if there are changes in the path along which the fiber tows are dispensed from the spool to the fiber placement head, when the path becomes shorter, slack occurs in the length of dispensed fiber tows which can cause bow-tying. This may occur such as when the fiber placement head is moved closer or farther away from the creel. One method to avoid bow-tying is to rewind the fiber tows onto the spool. However, because the backing sheet has been removed, if too much rewind occurs, fiber tow will be rewound directly onto other fiber tow which can cause the two layers to stick together causing problems in the system.

For instance, in some instances, a creel may be in a generally fixed position relative to a tool such with the fiber placement head being moved to place tow in varying locations. Such a fiber redirect mechanism is illustrated in U.S. patent application Ser. No. 11/510,165 to Hoffmann, filed Aug. 25, 2006, published as U.S. 2007/0044919 on Mar. 1, 2007, and assigned to the assignee of the instant application, the teachings and disclosure of which are incorporated herein by reference thereto.

Hoffman includes a fiber redirect mechanism which allows for the fiber placement head to be pivoted through a significant pivot angle. This fiber redirect mechanism is necessary as the creel in that application is prevented from pivoting or rotating along with the fiber placement head about various polar axis therein. As such, in Hoffmann, when the fiber placement head pivots about various axis within the wrist mechanism thereof, the location of the compaction roller of the fiber placement head changes is orientation relative to the creel.

Further, to adjust vertically, the entire fiber placement head is moved vertically towards or away from the creel which creates a significant change in the length of the tow path for individual tows as they travel from the spools within the creel to the fiber placement head.

Another problem can result in twisting a fiber tow over two short of a length. The shorter a length of the two that is twisted promotes increased localized twisting which can also degrade the tow. As such, if tows must be twisted, it is desired to twist them over an extended length. However, the desired longer length must be weighted against the overall size of the device such that tows can be placed in small female cavities of various shaped tools.

BRIEF SUMMARY OF THE INVENTION

Embodiments of the present invention relate to fiber placement systems for forming fiber composite components. More particularly, embodiments of the present invention relate to new and improved fiber placement systems that provide for improved protection of the fiber tows that are dispensed during the fiber lay-up process.

In one embodiment, a fiber delivery apparatus for a fiber placement system for the manufacture of composite fiber laminated products is provided. The fiber delivery apparatus includes an articulating wrist apparatus, a creel assembly and a fiber placement head. The articulating wrist apparatus includes first and second wrist elements operably coupled to one another for pivotable movement therebetween about a wrist axis. The creel assembly stores a plurality of fiber spools therein. Typically, this is a climate controlled creel assembly. The first wrist element is in a fixed axial position relative to the creel assembly such that the wrist axis remains in a fixed axial position relative to the creel assembly. The fiber placement head mounted to the second wrist element for pivotal movement about the wrist axis relative to creel assembly. Further, a tow path is formed between each of the plurality of spools and the fiber placement head.

In a more particular embodiment, the fiber spools and the fiber placement head are free of a linear degree of freedom therebetween. As such, the only way that the fiber placement head can change orientation relative to the spools is via pivotal movement.

To compensate for pivotal movement through the articulating wrist apparatus, one aspect of the invention is that the device may include a pivot angle redirect arrangement. This pivot angle redirect arrangement can be mounted to the second wrist element and is positioned along the tow paths between the spools and the fiber placement head.

In one embodiment, the pivot angle redirect arrangement is offset from the wrist axis along the tow paths between the wrist axis and the spools. This orientation extends the distance between the pivot angle redirect arrangement and the fiber placement head to reduce any negative affects on fiber tows due to any twisting of the fiber placement head relative to the first wrist element about a head axis that is perpendicular to the wrist axis.

In a more particular embodiment, the pivot angle redirect arrangement pivots about a pivot angle redirect axis relative to the second wrist element at a rate that is less than the rate that the second wrist element pivots relative to the first wrist element about the wrist axis.

In one embodiment, the offset between the wrist axis and the pivot angle redirect arrangement is such that when the second wrist element pivots relative to the first wrist element to a maximum angle, the overall length of each tow path does not increase by more than a diameter of the spools. As such, when the fiber placement head is returned to a central location, the extra length of fiber tow can be rewound onto the spools without overlapping onto fiber tow that has previously had its backing tape removed.

In one embodiment, the fiber delivery apparatus further includes a coupling for connecting the fiber delivery apparatus to a positioner system. The coupling is axially positioned between the creel assembly and the fiber placement head. The coupling being laterally offset from the creel assembly by a lateral coupling portion. This allows the fiber delivery apparatus to be positioned laterally offset from a vertical ram or other portion of the positioning system so as to reduce overall height and size of the fiber placement system. IN such an embodiment, the creel assembly may be at a same axial position as the vertical ram of a positioning system.

In an alternative embodiment, the coupling for connecting the fiber delivery apparatus to a positioner system may be positioned proximate a distal end of the fiber delivery apparatus. In such an arrangement, the creel assembly is substantially positioned axially between the coupling and the fiber placement head.

In one embodiment, the spools of the creel assembly form a unit of spools coupled to one another. The unit of spools rotate about a tree axis that is generally perpendicular to the wrist axis. In a more particular embodiment, the unit of spools and the articulating wrist apparatus both rotate about the tree axis relative to the coupling.

A further aspect of the present invention provides a pneumatic chuck assembly for selectively securing a spool of fiber tows to a fiber delivery apparatus. The chuck assembly includes a motor; a chuck; and a seal assembly. The chuck includes a cylindrical mounting body and a plurality of pneumatically actuated gripping plates mounted to the mounting body. The gripping plates move between a gripping position wherein the plates are biased radially away from the mounting body such that they can engage an inner diameter of a spool of fiber tow and a releasing position wherein the plates are biased radially inward toward the mounting body such that they would disengage an inner diameter of a spool of fiber tow. The mounting body includes a central air passage therethrough having an inlet formed in a cylindrical surface of the mounting body. This air passage transfers air pressure to operably actuate the gripping plates. The seal assembly including a seal collar and a pair of seal tubes. A portion of the mounting body (typically a stepped portion having a reduced diameter) includes the inlet extends into the seal collar. The inlet is positioned axially between the seal tubes. The seal tubes provide a seal between the mounting body and the sealing collar when inflated.

By using seal tubes, the seal tubes can be deflated to reduce frictional loading on the mounting body so that the seals do not oppose rotary motion of the mounting body when being driven by the motor. As such, in one embodiment, the mounting body is rotatable relative to the sealing collar. The seal tubes are configured to apply substantially no friction to the mounting body when seal tubes are deflated.

To position the seal tubes, in one embodiment, an inner cylindrical surface of the seal collar includes a pair of annular channels. The seal tubes are carried in the annular channels. The seal tubes have an inner diameter when inflated that is smaller than the inner cylindrical surface of the seal collar and that is smaller than the outer surface of the mounting body. Thus, when inflated, the seal tubes will seal on the outer surface of the mounting body.

Preferably, the seal tubes have an inner diameter that is greater than the outer surface of the mounting body when the seal tubes are deflated so as to reduce frictional engagement between the seal tubes and the mounting body when it is not desired to have a seal between the seal collar and the mounting body (such as when the spools are being driven by the motor).

To supply air to the seal tubes as well as to the central passage of the mounting body, in one embodiment the seal collar includes a pair of air passages passing therethrough. One air passage is coupled to the pair of seal tubes and the other air passage is operably coupled to the inlet of the cylindrical surface of the mounting body when the pair of seal tubes are inflated.

A further embodiment of the invention is a fiber delivery system including a positioner system and a fiber delivery apparatus coupled to the positioner system. The fiber delivery apparatus includes an articulating wrist apparatus including first and second wrist elements operably coupled to one another for pivotable movement therebetween about a wrist axis; a creel assembly storing a plurality of fiber spools therein, the first wrist element in a fixed axial position relative to the creel assembly such that the wrist axis remains in a fixed axial position relative to the creel assembly; and a fiber placement head mounted to the second wrist element for pivotal movement about the wrist axis relative to creel assembly, a tow path being formed between each of the plurality of spools and the fiber placement head. A mechanical interface releasably couples the positioner system to the fiber delivery apparatus.

In one embodiment, the positioner system is a gantry system that provides only linear degrees of freedom and the fiber delivery apparatus is substantially free of linear degrees of freedom between the fiber spools and the fiber placement head.

In a further embodiment, the fiber delivery apparatus includes a laterally extending coupling portion that forms a portion of the mechanical interface. The positioner system includes a vertical ram. The vertical ram couples to the laterally extending coupling portion such that both the vertical ram and the creel assembly are on a same side of the laterally extending coupling portion and the fiber placement head is on an opposite side of the laterally extending coupling portion. This arrangement provides for a reduced overall vertical height to the system.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 12-14 are partial cross-sectional illustrations of the chuck assembly of FIG. 10 in a spool engaging position; and FIGS. 15-17 are partial cross-sectional illustrations of the chuck assembly of FIG. 10 in a spool releasing position.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
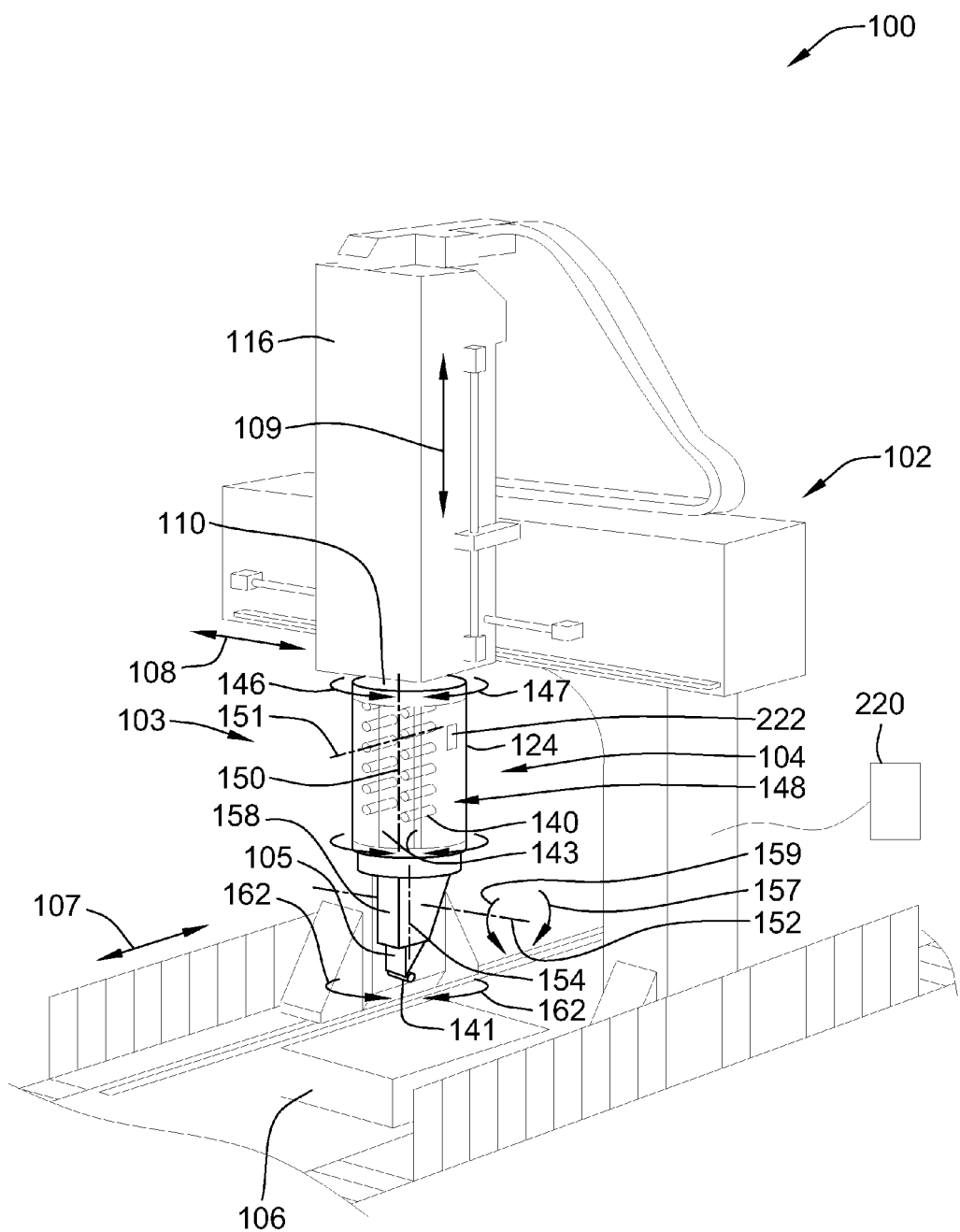
FIG. 1 is simplified illustration of an embodiment of a fiber placement system according to the present invention including a fiber delivery apparatus detachably secured to a vertical ram and operating against a static tool.

FIG. 1 illustrates an embodiment of a fiber placement system 100 according to an embodiment of the present invention. The fiber placement system 100 generally includes a positioning system in the form of gantry system 102 and an end effector attached to the gantry system in the form of a fiber delivery apparatus 103 (also referred to as a "creel and fiber placement head assembly"). The fiber delivery apparatus 103 includes a self-contained creel assembly 104 (hereinafter creel assembly 104) and a fiber placement head 105. The fiber placement system 100 is used to layup fiber tows onto a tool 106 to form composited parts.

The gantry system 102 provides, at least, three linear degrees of freedom 107, 108, 109 for linearly positioning the fiber delivery apparatus 103 and particularly the fiber placement head 105 thereof relative to the tool 106. However, the invention is not so limited and other gantry system arrangements can be provided. Further yet, other positioning systems could include a multi-degree of freedom robot, typically referred to as a SCARA robot.

The fiber delivery apparatus 103 is attached to an end of vertical ram 116. Typically, a releasable connection is provided between the fiber delivery apparatus and the ram 116 such that the fiber delivery apparatus 103 can be selectively attached and detached therefrom. This allows for switching between various different heads. The fiber delivery apparatuses 103 may be detachably secured to the vertical ram 116 by means of a mechanical interface 110. This mechanical interface can provide for automated interchangeability. For instance, a clamp arrangement between the fiber delivery apparatus 103 and gantry 102 may be used that automatically disengages and engages. Alternatively, a threaded or magnetic coupling could be used to couple the fiber delivery apparatus 103 to the ram 116. Other couplings are contemplated to provide for interchangeability and disconnection of the fiber delivery apparatus 103 from ram 116.

The fiber delivery apparatus 103 generally includes creel assembly 104 and a fiber placement head 105 for fiber tow lay-up. The creel assembly 104 includes a creel 124. The creel 124 is a climate controlled environment in which a plurality of spools 140 of fiber tow are stored. Within the creel 124 are further components of the creel assembly 104 that assist in dispensing and directing the fiber tows to the fiber placement head 105. Typically, as will be more fully discussed below, a plurality of spools 140 are stored in the creel 124. In larger embodiments, the creel 124 can store in excess of 16 spools 140 while smaller embodiments may include only 4 or 8 spools 140 within the creel 124 so as to reduce the overall footprint of the fiber delivery apparatus 103.

In the embodiment of FIG. 1, the mechanical interface 110 (i.e. coupling) is at a top end of the fiber delivery apparatus 103 such that substantially all, if not all, of the primary components of the fiber delivery apparatus 103 are positioned axially below vertical ram 116. In the illustrated embodiment, the mechanical interface 110 is positioned axially between the vertical ram 116 and creel 124 such that all spools 140 are positioned axially below the mechanical interface 110. Further, the fiber placement head 105 is axially below mechanical interface 110.

The fiber placement head 105 performs the necessary operations to the fiber tows or tool 106 to layup (also referred to as lay down) the fiber tows onto the tool 106. The fiber placement head 105 typically includes a compaction roller 141 and other components used for fiber lay-up which may include heaters for heating the tows or the tool 106, visual inspection devices, tow cutters, etc. These additional components need not necessarily be part of the fiber placement head but could form other parts of the fiber delivery apparatus 103.

The compaction roller 141 is typically considered part of the fiber placement head 105, but in some embodiments may not be considered part of the fiber placement head 105. A portion of fiber placement head 105 may or may not be positioned in a portion of creel assembly 104 or creel 124. This is one embodiment of the fiber delivery apparatus 103.

As can be understood from FIG. 1, the entire fiber delivery apparatus 103 is positionable along the three linear axes 107-109 provided by gantry 102 relative to tool 106.

As compared to other fiber placement systems, such as Hoffmann discussed above, the entire fiber placement apparatus (i.e. creel 124 and head 105) is attached to the end of and carried by the vertical ram 116. Thus positioning of head 105 via gantry 102 does not affect the fiber tow path between spools 140 and head 105.

In one embodiment, the tow paths between the spools 140 and the fiber placement head 105 defined by the individual tows is substantially if note entirely housed within the fiber delivery apparatus 103 such that the fiber tows are not exposed or only exposed for a limited time to the operating environment until they are being placed laid up on tool 106. This significantly reduces the opportunity for fouling or otherwise damaging the tows.

In Hoffman the head is attached to the vertical ram while the creel head is not attached to the vertical ram. Thus, as the ram moves up and down, the length of the tow path between the spools and the fiber placement head increases and decreases. As noted above, this created potential problems for bow-tying or the need to rewind a significant length of tow back onto spools 140 to prevent undesirably slack. Thus, by having the creel assembly 104 and fiber placement head 105 both carried by gantry 102, this problem is rectified.

Several rotational degrees of freedom are provided to the embodiment of FIG. 1 to provide for facilitating fiber layup within female tools as well as to facilitate transitioning back and forth across the tool 106. Typically, a fiber placement head 105 can only dispense fiber tows when traveling in one direction. Thus, once the head 105 has traversed all the way across a given layup path along the tool, the head 105 must be rotated to apply another pass of fiber tow.

One rotational degree of freedom may be provided proximate the mechanical interface 110 between the fiber delivery apparatus 103 and vertical ram 116. This degree of freedom rotates substantially the entire fiber delivery apparatus 103 (i.e. at least the creel assembly 104 and fiber placement head 105) relative to gantry 102 as illustrated by arrows 146, 147.

In one embodiment, the spools 140 are mounted to a support arrangement 143 that forms a unit of spools 148 (also referred to as a tree). The spools 140 can rotate relative to the support arrangement 143 about spools axis 151 to dispense fiber tows therefrom. The unit of spools 148 is permitted to rotate within the outer shell of creel 124 as an entire unit about rotational axis 150 (also referred to as tree axis 150). Typically this axis is perpendicular to spool axis 151 about which the spools dispense tow. This tree axis 150 is generally parallel with or co-axial with the axis about which the entire fiber delivery apparatus 103 may rotate relative to vertical ram 116. As such, tree axis 150 is generally vertical and spool axis 151 is generally horizontal.

Absent rotation of any of the other pieces about another degree of freedom, rotation of the unit of spools 148 about tree axis 150 will, in some embodiments, also rotate the head 105 about tree axis 150.

A further axis of rotation 152 (also referred to as wrist axis 152) allows the head 105 to pivot angularly relative to the creel 124 and more particularly unit of spools 148, as illustrated by arrows 157, 159. As such, wrist axis 152 is typically perpendicular to tree axis 150. This rotational movement is provided by an articulating wrist apparatus 158 similar to that of Hoffmann.

Further, a fourth axis of rotation 154 (also referred to as "head axis 154") is provided that allows the head 105 to rotate relative to the articulating wrist apparatus 158, such as illustrated by arrows 162, 164.

In one embodiment, spool axis 151 remains parallel at all times to the axis about which compaction roller 141 rotates. In further embodiments, the spool axis 151 and compaction roller 141 are maintained parallel to one another at all times during fiber layup however head 105 is permitted to rotate relative to unit of spools 148, such as about head axis 154. This rotation would occur only during non-fiber layup activities and the fiber placement head 105 would be rotated back and forth 180 degrees to maintain the axis of the compaction roller 141 parallel to spool axis 151.

It is an aspect of an embodiment of the present invention that the fiber placement head 105 only has rotational degrees of freedom between the spools 140 and the fiber placement head 105. More particularly, the fiber placement head 105 can have its orientation relative to the spools 140 changed via pivotal movement about wrist axis 152 or alternatively head axis 154. This is unlike Hoffman which provided for a linear degree of freedom relating to the vertical axis because the creel assembly thereof was in a fixed vertical position relative to the gantry while the fiber placement head could be driven vertically up and down by the gantry. This new arrangement significantly reduces the amount of rewind of fiber tows that may be required. More particularly, when the fiber placement head is required to be positioned vertically, the entire fiber delivery apparatus 103 including creel assembly 104 and fiber placement head 105 are moved simultaneously about axis 109 provided by gantry 102. As such, in one embodiment, the fiber delivery apparatus 103 is free of linear degrees of freedom between the spools 140 and fiber placement head 105. It should be noted that "free of linear degrees of freedom between the spools 140 and fiber placement head 105" shall permit very small linear motion of the compaction roller so as to accommodate minor changes in fiber layup, such as for example pressure against tool 106.

Figure 2:
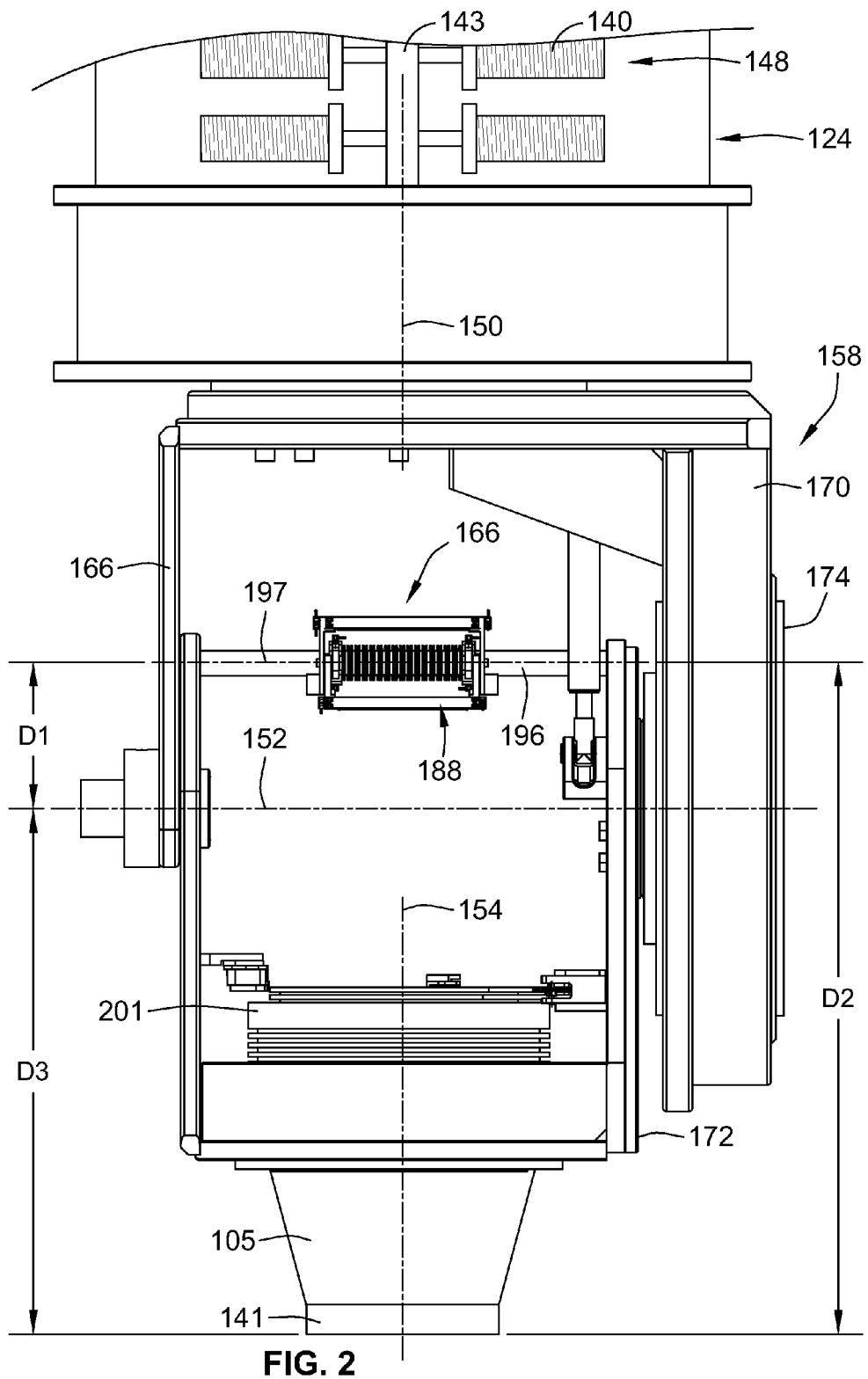
FIG. 2 simplified partial illustration of the fiber delivery apparatus of FIG. 1 illustrating the fiber redirect arrangement thereof.

With reference to FIG. 2, the articulating wrist apparatus 158 includes first and second wrist elements 170, 172 that pivot relative to one another about wrist axis 152. Wrist torque motor 174 pivots the two wrist elements 170, 172 relative to one another about wrist axis 152.

The entire wrist apparatus 158 and components carried or attached thereto can also be rotated about tree axis 150 along with spool unit 148, as discussed previously. Rotation about axis 150 can be effectuated by a torque motor.

A fiber redirect arrangement 166 is carried within articulating wrist apparatus 158 to facilitate redirecting the fiber tows when the wrist elements 170, 172 pivot about wrist axis 152. The redirect arrangement 166 operates similar to that described in Hoffmann.

While being shown laterally offset from the centerline of creel 124 and redirect arrangement 166, typically, spools 140 are centered and aligned with the redirect arrangement 166 to avoid any unnecessary redirects between the spools 140 and the redirect arrangement 166.

Figure 3:
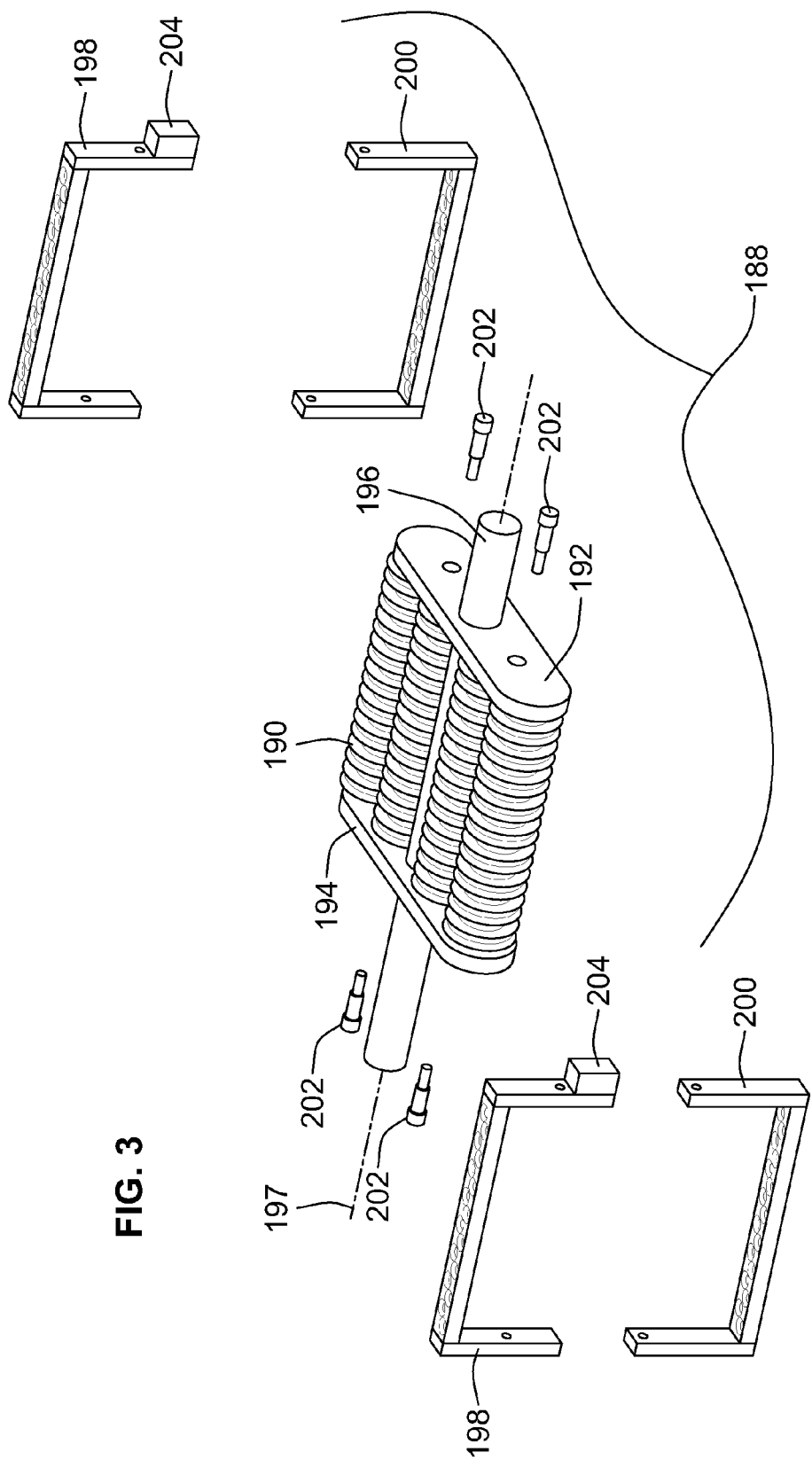
FIG. 3 is a simplified exploded illustration of a portion of the fiber redirect arrangement of FIG. 2.
Figure 4:
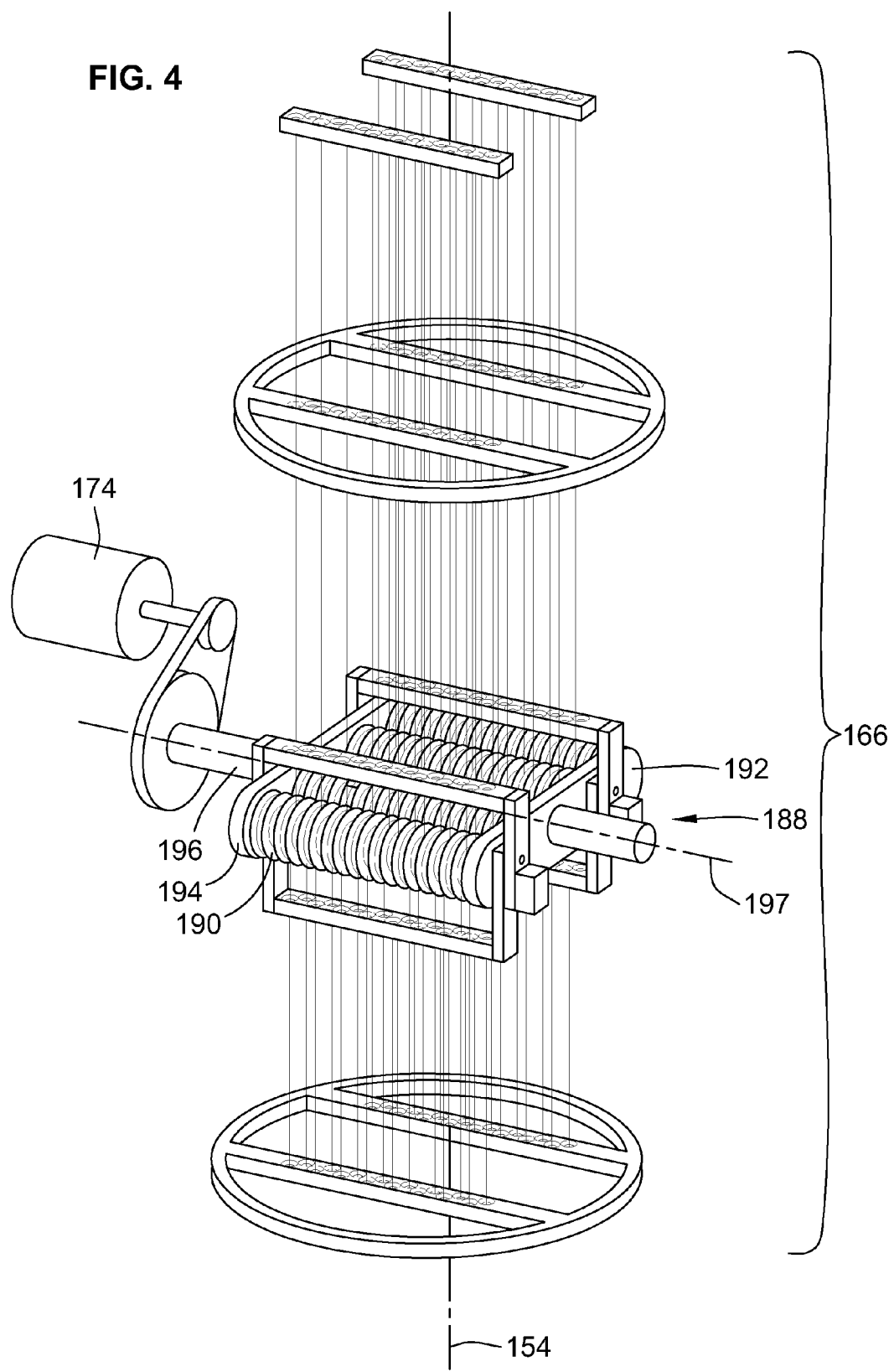
FIG. 4 is a simplified illustration of the fiber redirect arrangement of FIG. 2.

With additional reference to FIGS. 3 and 4, the redirect arrangement 166 includes a wrist pivot angle redirect arrangement 188 having four rows of guide wheels rotatably attached to four guide wheel shafts (not shown) parallel to wrist axis 152. The guide wheels 190 are mounted about rotational axes within a common plane that is offset from and does not include wrist axis 152. The ends of the mounting shafts of the guide wheels 190 are attached to a pair of guide wheel support bars 192, 194 attached to a pivot angle redirect drive shaft 196. The drive shaft 196 may be driven by wrist torque motor 174 (as in the illustrated embodiment) or have a separate independent motor to drive the orientation of the wrist pivot angle redirect arrangement 188 relative to the first and second wrist elements 170, 172 about redirect arrangement axis 197. This pivotal movement occurs when the articulating wrist apparatus 158 pivots about wrist axis 152.

Figure 6:
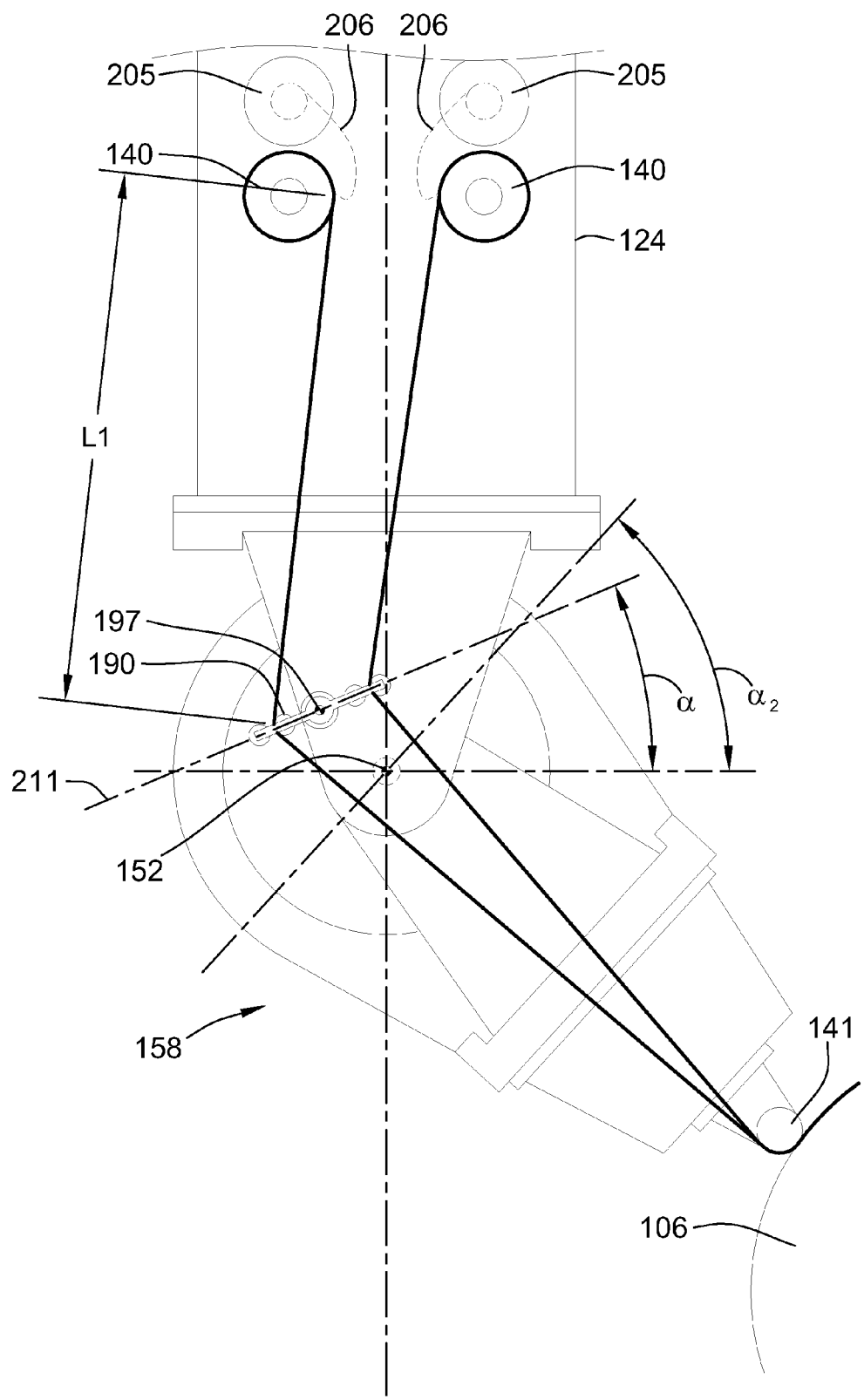
Figure 7:
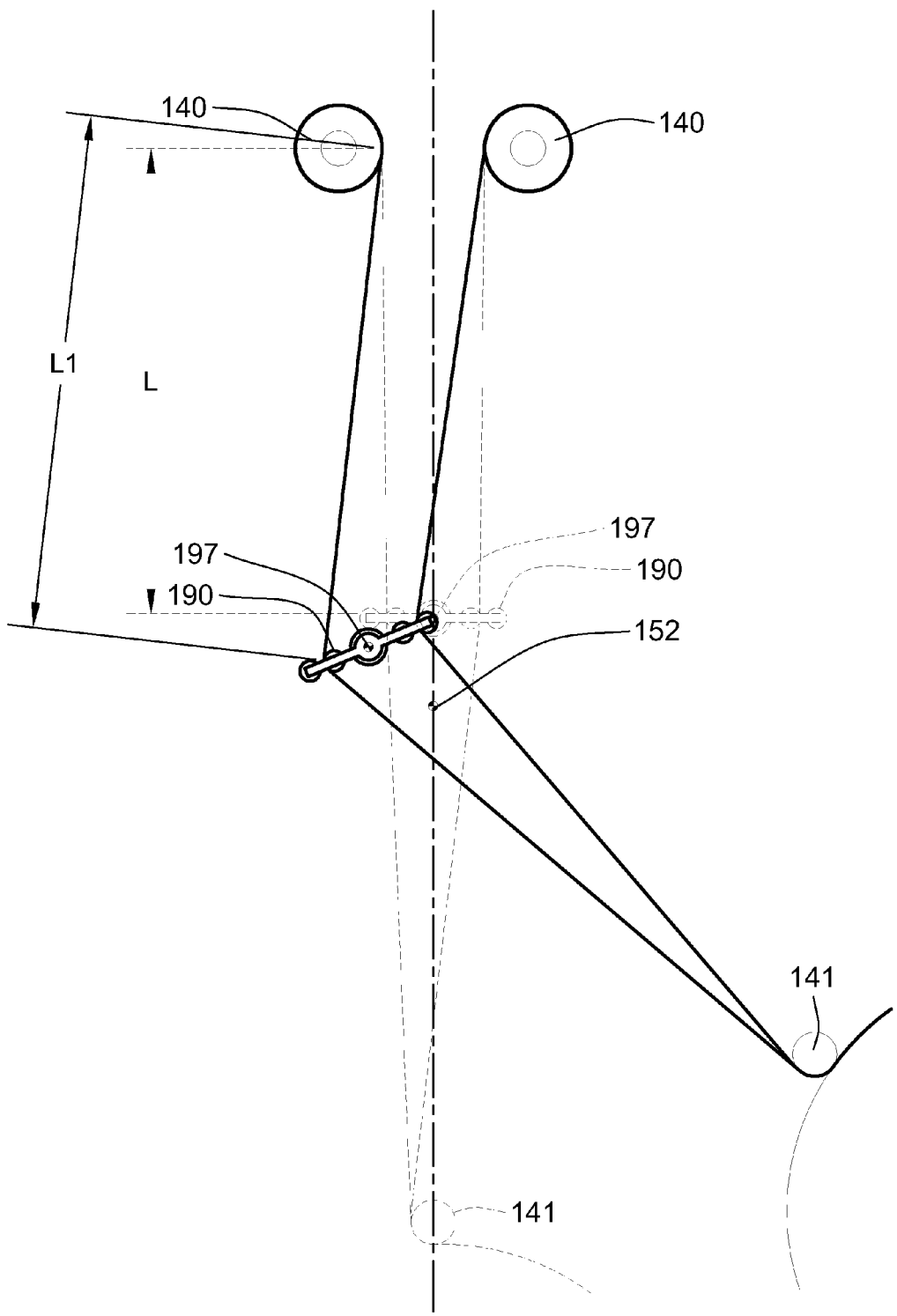

With reference to FIG. 6, the drive arrangement for driving redirect drive shaft 196 is typically configured such that when articulating wrist apparatus 158 pivots about wrist axis 152 by an angle $\alpha$ relative to horizontal, the plane 211 defined by the plurality of rows of wheels 190 pivots an angle $\alpha 2$ relative to horizontal which is less than angle $\alpha$ in magnitude. Typically, angle $\alpha 2$ is half of angle $\alpha$.

With reference to FIGS. 2-5, the drive shaft 196 and redirect arrangement axis 197 are offset from wrist axis 152 by a distance D1. The rows of guide wheels 190 are arranged such that two rows of the guide wheels 190 are positioned side-by-side, on each side of the redirect arrangement axis 197, with the number of wheels, and their configuration being selected in consideration of the number of fiber tows needing redirection. Typically, half of the fiber tows passing between the rows of wheels 190 are on one side of the redirect arrangement axis 197 and half of the fiber tows passing between the rows of wheels 190 on the opposite side of the redirect arrangement axis 197.

The pivot angle redirect arrangement 188 can also includes two sets of upper and lower pivot redirect guide bars 198, 200, which are pivotably attached by shoulder bolts 202 to the pivot angle redirect guide wheel support bars 192 and 194. The upper and lower pivot redirect guide bars 198, 200 include a plurality of guide holes therein, through which the fiber tows disposed on either side of axis 197 are threaded. The redirect guide bars 198, 200 are positioned above and below the guide wheels 190, for directing the fiber tows into the spaces between the rows of guide wheels 190. The upper pivot redirect guide bars 198 include a counterweight 204 to orient the upper pivot redirect guide bars 198 in a manner facilitating threading the fiber tows through the upper pivot redirect guide bars 198.

The fiber redirect apparatus 166 is carried by second wrist element 172 such that rotation of second wrist element 172 about wrist axis 152 relative to the first writ element also causes the redirect apparatus 166 to rotate around wrist axis 152.

Figure 5:
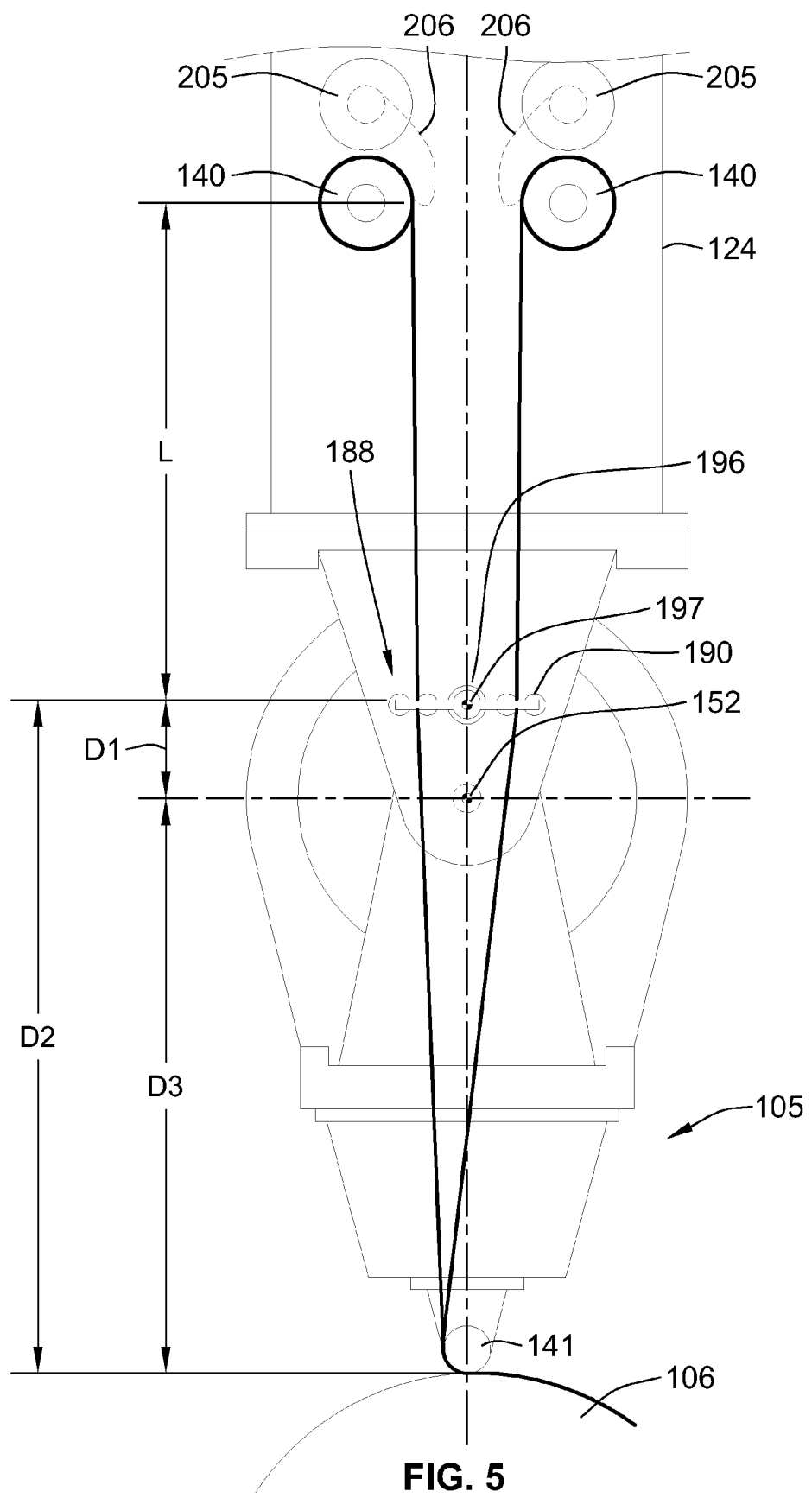
FIGS. 5-7 are simplified schematic illustrations of the fiber delivery apparatus of FIG. 1 illustrating the operation of the fiber redirect arrangement thereof.

With principle reference to FIGS. 2 and 5, the drive shaft 196 is positioned on the opposite side of wrist axis 152 as fiber placement head 105. This arrangement provides the benefit of increasing the distance D2 between the fiber placement head 105 and the rows of guide wheels 190. The increased distance D2 extends the length of tow that is exposed to twisting when the fiber placement head 105 is rotated about axis 154 relative to the fiber redirect apparatus 166. By increasing the length of tow, the degree of twisting of an incremental length of tow is reduced thus reducing the risk of damaging or weakening the fiber tows as a result of the twisting.

However, by offsetting the redirect apparatus 166 on the opposite side of rotational axis 152, the distance D3 between the rotational axis 152 and the compaction roller 141 can be maintained substantially the same. This allows the fiber placement head 105 to be positioned within a same or similar sized female part while reducing the detrimental affects on the fiber tows induced due to rotation/twisting about axis 154.

With reference to FIGS. 5-8, because the rows of guide wheels 190 are offset from rotational axis 152, as the fiber placement head 105 rotates about axis 152, this causes the length of the tow path from the spools 140 to the fiber placement head 105 to vary. Thus, as the fiber placement head 105 is rotated about axis 152 from angle α (See FIG. 6 or solid lines in FIG. 7), back to a central or vertical position (see FIG. 5 or dashed lines in FIG. 7) the tow paths are shortened. This is illustrated, in part, by the difference in lengths L and L1 in FIG. 7.

To avoid slack from being generated which can result in bow-tying and fowling of the fiber tows, the excess fiber tow is rewound back onto spools 140. Rewinding can also be used to maintain the desired tension in the fiber tows during fiber layup.

With reference to FIG. 5, the fiber tows typically are wound around spools 140 with a layer of backing tape between adjacent layers of fiber tow to avoid adhering adjacent layers together. The illustrated embodiment, includes backing tape winders 205 for gathering the backing tape 206 as it is removed from the fiber tows.

In a preferred embodiment, the offset distance D1 is sized such that when the fiber placement head 105 is rotated about axis 152 from the center position (FIG. 5) to the maximum value of angle α (FIG. 6), or alternatively in the opposite direction from the maximum angle α (FIG. 6) to the center position (FIG. 5), the change in tow path length is substantially no greater than the circumference of a spool 140 in an empty state. This allows the portion of tow that must be rewound, to avoid slack within the tow path, to be rewound onto the corresponding spool 140 without over lapping onto fiber tow that has had backing tape 206 removed. This reduces the likelihood of the overlapped portions of tow from sticking together.

Figure 8:
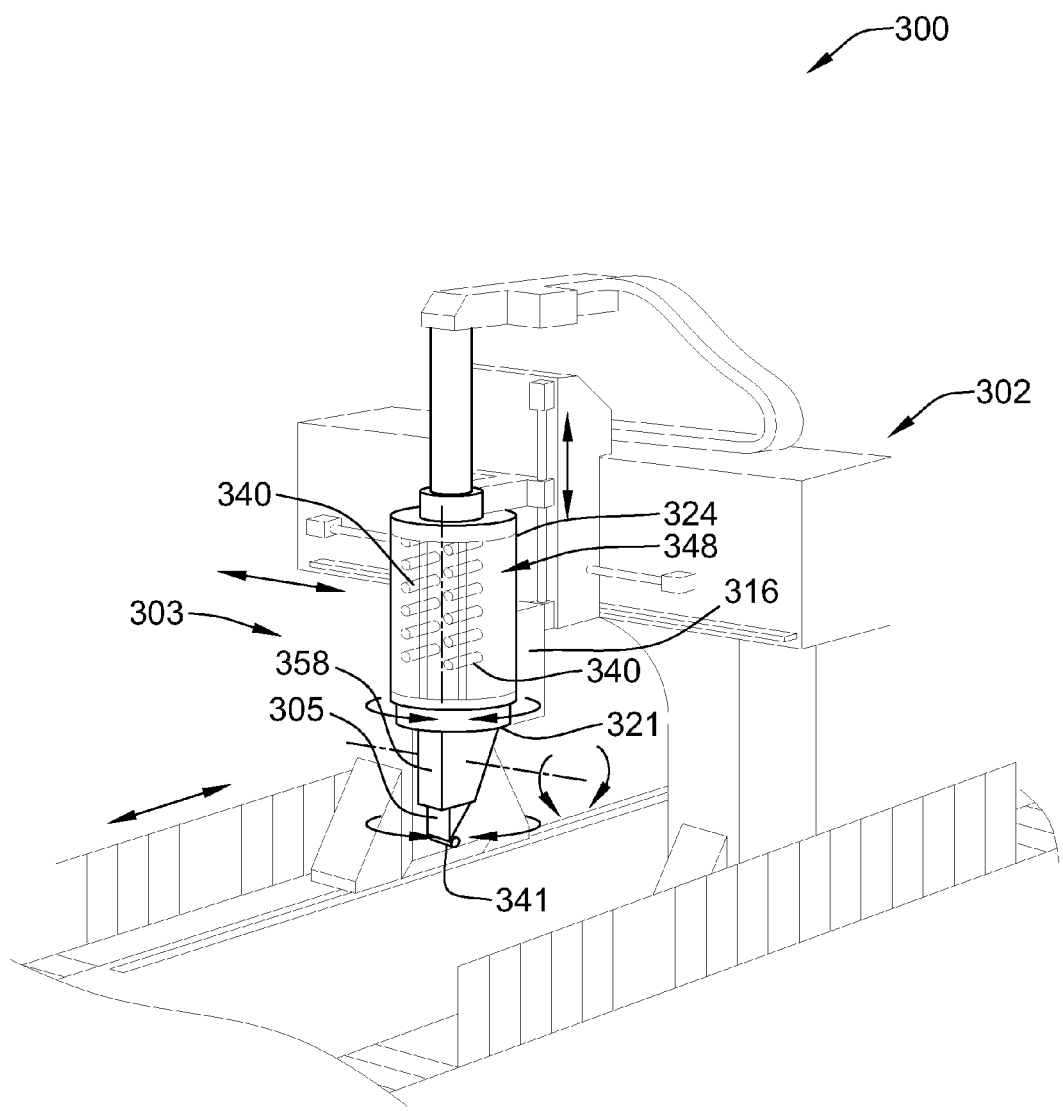
FIG. 8 is a simplified illustration of a further embodiment of a fiber placement system.
Figure 9:
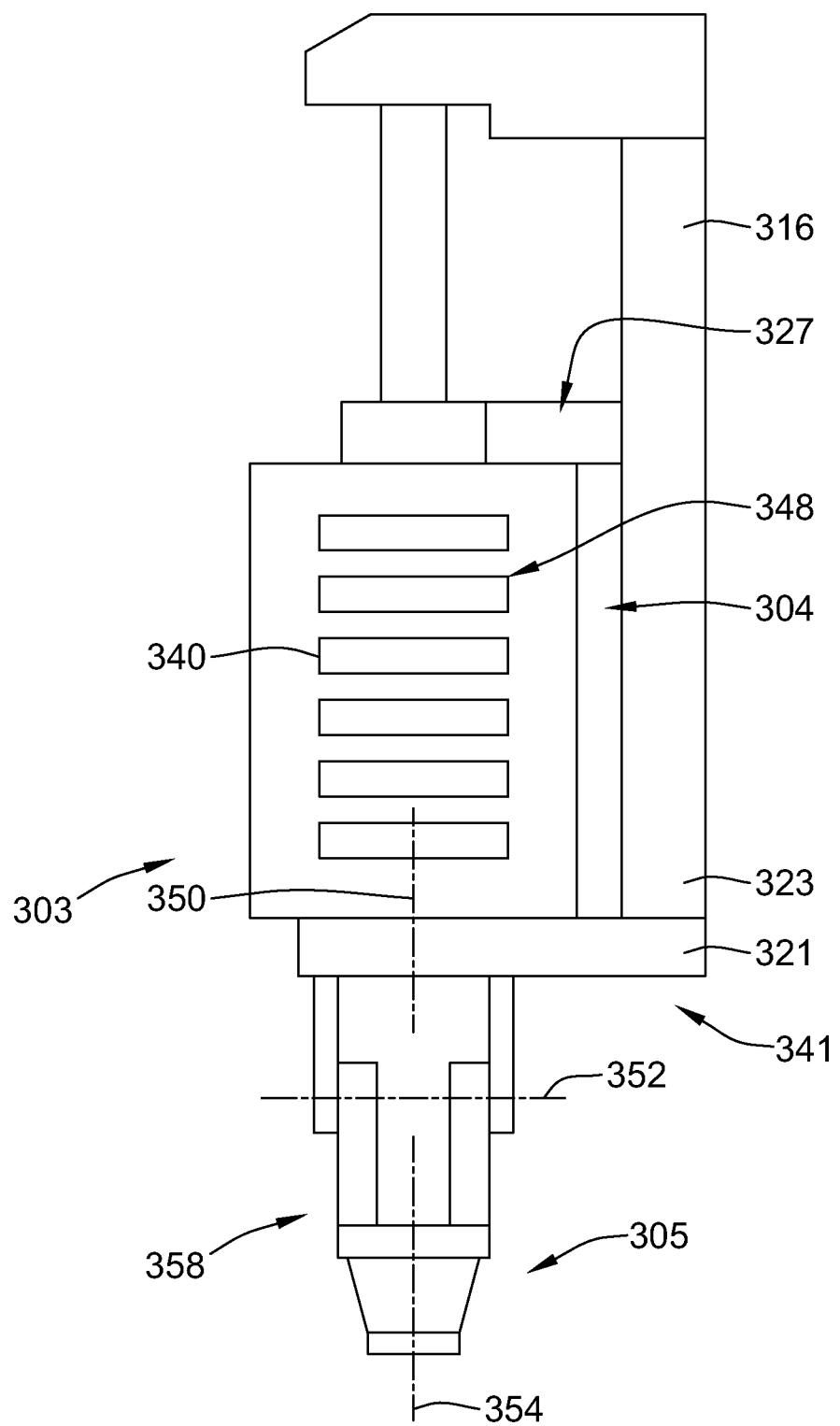
FIG. 9 is a simplified partial side view illustration of the fiber delivery apparatus of FIG. 8 in relation to a vertical ram of the gantry system of FIG. 8.

FIG. 8 illustrates a further embodiment of a fiber placement system 300. This embodiment is similar in that it includes a 3-axis linear gantry 302. Further, the arrangement has similar rotational degrees of freedom as the prior embodiment. With reference to FIG. 9, this arrangement includes at least rotational degrees of freedom including tree axis 350, wrist axis 352 and head axis 354. As such, this arrangement is similar in many respects to the prior embodiment and the differences therebetween will now be discussed.

This embodiment provides for a much shorter overall system. To do this, the fiber delivery apparatus 303 has a different mounting orientation relative to the gantry 302. As best illustrated in FIG. 9, the principal mechanical interface 341 between the vertical ram 316 of gantry 302 and the fiber delivery apparatus 303 is not at an axial end of the fiber delivery apparatus 303. Instead, in this embodiment, the principle mechanical interface 341 is positioned axially between the creel assembly 304 and the fiber placement head 305.

This provides a benefit of reducing the overall height of the fiber placement system 300 while still providing for the same amount of vertical displacement of fiber placement head 105. Another benefit for this arrangement is the creel assembly 304 need not be as structurally strong as in the prior embodiment. In this embodiment, the lateral loads applied to the fiber placement head 305 do not pass entirely through the creel assembly 304. Instead, these loads are transferred from the ram 316 through the mechanical interface 341 without having to be transferred through the creel assembly 304. This significantly reduces the bending moment applied through the fiber delivery apparatus 303 as compared to when the device is mounted to the gantry at one of the distal ends of the fiber delivery apparatus 303.

In this design, the vertical ram 316 and the mechanical interface 341 forms a generally L-shaped profile. The mechanical interface 341 includes a laterally extending coupling portion 321 that forms part of the fiber delivery apparatus 303. This coupling portion 321 includes the interface that cooperates with a corresponding end 323 of the vertical ram 316. Thus, in this arrangement, the coupling between the vertical ram 316 and the fiber delivery apparatus 303 is both axially between the creel assembly 304 and laterally offset to a side of the fiber delivery apparatus 303. As such, the vertical ram 316 is not axially aligned with the fiber delivery apparatus 303. Instead, at least a portion of the fiber delivery apparatus 303 overlaps with ram 316. In this embodiment, the creel assembly 304 overlaps with ram 316. Further, the coupling portion 321 is axially positioned between the articulating wrist arrangement 358 and the creel assembly 324.

With the fiber delivery apparatus 303 laterally offset from the vertical ram, a bending moment is imparted on the laterally offset coupling portion 321 and the mechanical interface 341 generally. A second coupling portion 327 can be provided that is axially offset from the laterally extending coupling portion 321. This second coupling portion 327 is illustrated as being vertically above the creel assembly 304. Thus, in this arrangement, the creel assembly 304 and, particularly, spools 340 are axially positioned between coupling portion 321 and second coupling portion 327.

Thus, in this arrangement, substantially only the articulating wrist arrangement 358 and the fiber placement head 305 are axially below the mechanical interface 341 between the ram 316 and the fiber delivery apparatus 303.

Typically, in this design, the entire creel assembly 304 will not rotate relative to gantry 302. Instead, the unit of spools 348 within creel 324 will rotate but the outer shell of creel 324 will remain at all times stationery relative to vertical ram 316 as well as lateral coupling portion 321.

Fiber placement systems 100, 300 can be provided with a separate controller for positioning the compaction rollers 341 relative to a tool than for controlling the operation of the creel assembly operations that affect the fiber tow being laid-up on the tool.

Figure 10:
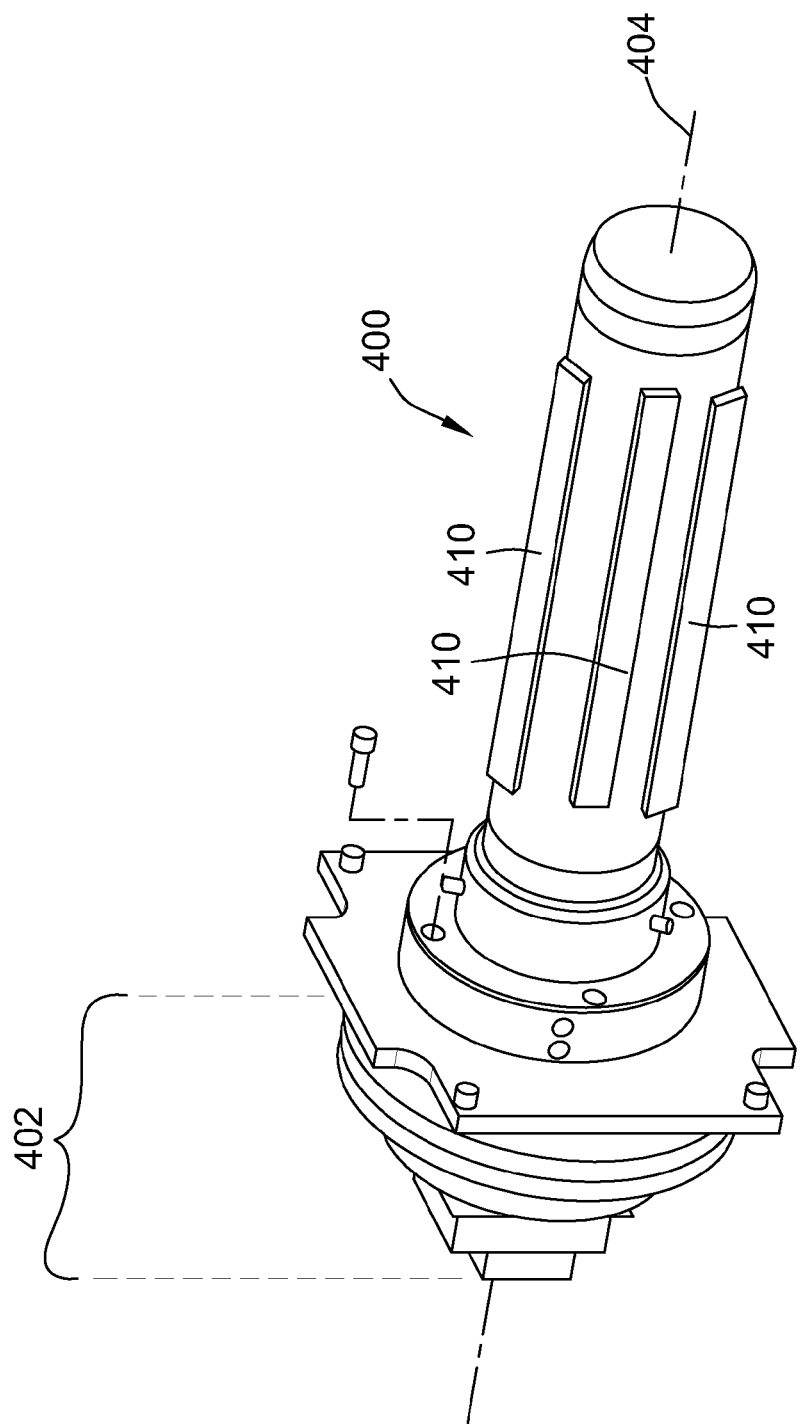
FIG. 10 is a perspective illustration of a chuck assembly for holding a spool of fiber within a fiber delivery system.

With reference to fiber placement system 100 of FIG. 10, a positioning controller 220 is provided that controls all positioning operations for positioning the compaction roller 141 relative to tool 106. As such, positioning controller 220 would control all manipulations along linear axes 107-109 as well as all pivotal movement of the system about all polar axes, such as tree axis 150, wrist axis 152 and head axis 154.

The second controller is a fiber placement controller 222. The fiber placement controller 222 is typically carried by the fiber delivery apparatus 103. As such, when the fiber delivery apparatus 103 is disconnected from gantry 102, the fiber placement controller 222 remains with the fiber delivery apparatus 130.

The fiber placement controller 222 controls all actions of the fiber delivery apparatus 103 relating specifically to manipulation or preparation of the tows during fiber lay-up. For instance, the fiber placement controller 222 would control all actions relating to dispensing or rewinding tow from spools 140, which includes maintaining proper tension in the tows. The fiber placement controller 222 would also control a cutter that cuts the fiber tows. The fiber placement controller would control any heaters that heat the tows or the tool. The fiber placement controller would control any sensors that analyze/inspect the tows during lay-up operations. The fiber placement controller 222 would not control operations such as pivotal movement about the polar axes 150, 152, 154.

Typically, the fiber placement controller 222 is fed strictly one or more coordinates relating to or corresponding to the position of compaction roller 141. From this information, all operations that affect layup of the tows that are performed by the fiber delivery apparatus 103 are determined and controlled by fiber placement controller 222.

This split controller arrangement has several benefits over a single controller. First, the fiber placement controller 222 can be placed significantly closer to the actual devices it is controlling, such as the cutter, the spools 140, the heater, etc. This reduces any errors due to time lag within the system. Second, by providing a controller in the actual fiber delivery apparatus 103 that controls the operations of the fiber delivery apparatus 103, when the fiber delivery apparatus 103 is connected to a random gantry system 102, there is no need to reprogram the controller of the gantry system 102 with all of the logic and algorithms for the given fiber delivery apparatus. The gantry controller 220 would only need to be programmed to control any positioning devices, e.g. wrist arrangement 158.

In some embodiments, the fiber placement controller 222 can actually be split into separate controllers. One controller can be a creel controller placed in the creel for controlling all operations that occur within the creel. A second controller can be a fiber placement head controller that controls all operations that occur with the fiber placement head 105. Again, this locates the controllers closer to the actual devices that are being controlled.

FIG. 10 illustrates a chuck assembly 400 for mounting spools 140 (not shown) within creel 124. The chuck assembly would form part of the unit of spools discussed previously and provides spool axis identified above.

The chuck assembly 400 is operably coupled to a motor arrangement 402 that operably drives the chuck assembly 400 to dispense or rewind fiber tows onto the spools during operation. The motor arrangement 402 typically includes a pneumatic motor for rotatably driving the chuck assembly 400 about rotational axis 404 (e.g. spool axis 151).

Figure 11:
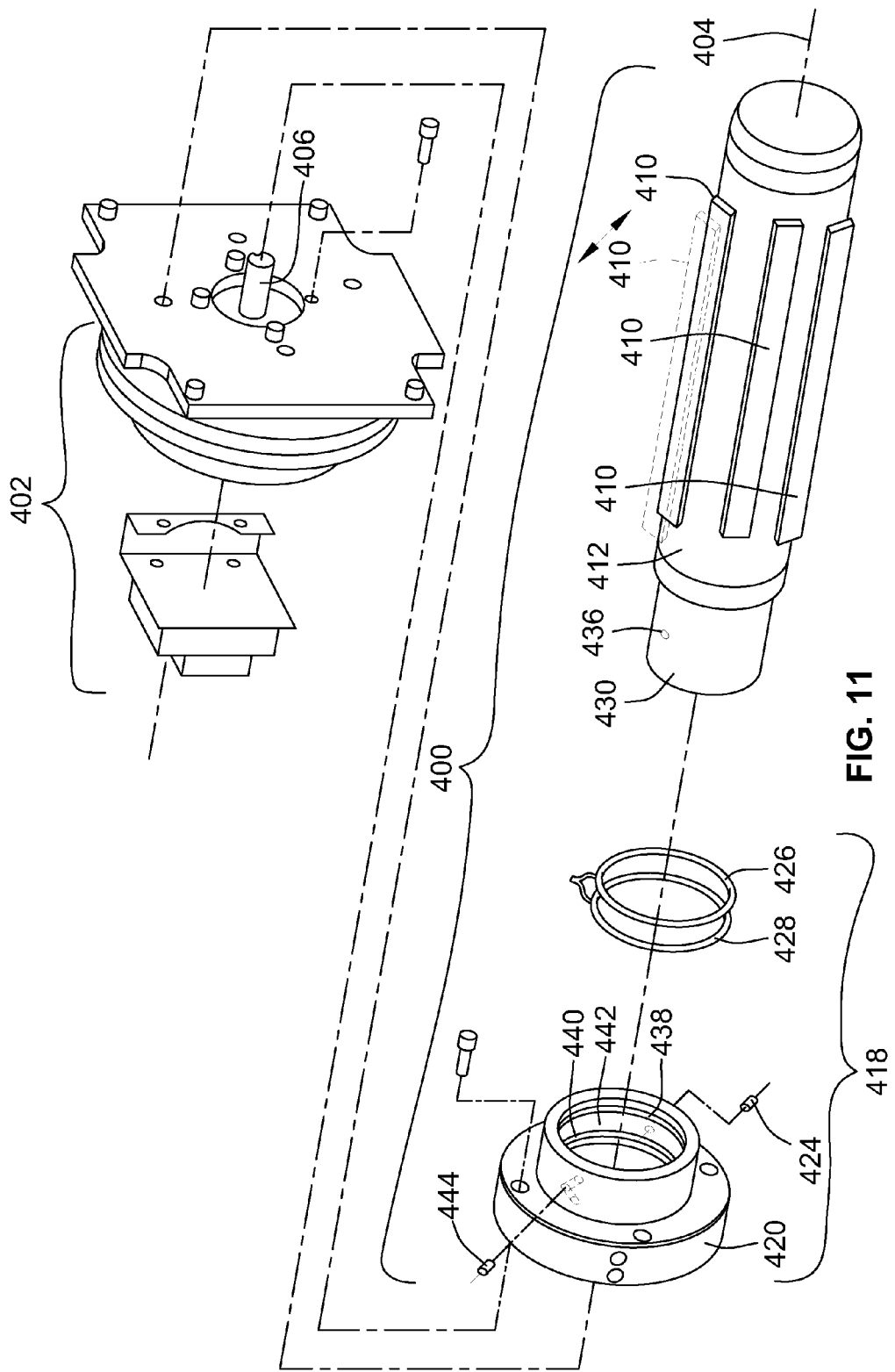
FIG. 11 is an exploded view of the chuck assembly of FIG. 10.

With additional reference to FIG. 11, in the illustrated embodiment, drive shaft 406 of the motor arrangement 402 engages a corresponding structure of the chuck assembly 400 to transfer rotary motion of the pneumatic motor to the chuck assembly 400.

The chuck assembly 400 includes a plurality of gripping plates 410 that are driven radially inward and outward to selectively engage or disengage an inside diameter of a spool of tow. When the gripping plates 410 are biased radially inward toward mounting body 412 (see FIG. 15 or solid lines in FIG. 11), the gripping plates 410 will disengage an inner diameter of the spool. In this orientation, the spools can be removed from the chuck assembly 400 and replaced. When the gripping plates 410 are biased radially outward and away from mounting body 412 (see FIG. 12 or dashed lines in FIG. 11), the gripping plates 410 will engage the spool such that the motor assembly 402 can rotatably drive the spools to either dispense or rewind the tows stored thereon to maintain the desired tension in the tows during fiber placement.

The gripping plates 410 of chuck assembly 400 are operated using pneumatics. When air pressure is supplied to the chuck assembly 400, the gripping plates 410 are biased radially inward toward mounting body 412. When air pressure is released, the gripping plates 410 are biased radially outward.

With reference to FIGS. 11 and 12, the mounting body 412 includes a central air passage 414 through which the pressurized air passes to selectively operate gripping plates 410. This air is supplied by air supply 416 when needed.

The chuck assembly 400 includes a seal arrangement 418 that selectively seals and unseals the central air passage 414 when air pressure is applied and relieved from mounting body 412. The seal arrangement 418 is designed to provide substantially no frictional resistance to the rotary movement of the mounting body 412 during normal operation (i.e. when air pressure is not provided to the mounting body 412).

The seal arrangement 418 includes a seal collar 420 through which the air is supplied to central air passage 414. The seal collar 420 caries a first pneumatic fitting 424 that is connected to air supply 416. The seal collar 420 also carries a pair of seal tubes 426, 428 that when inflated operably seal the seal collar 420 to an outer cylindrical surface 430 of mounting body 412 to sealingly fluidly connect first pneumatic fitting 424 to the central air passage 414 (see FIGS. 15-17). Thus, when seal tubes 426, 428 are inflated and sealed between seal collar 420 and cylindrical surface 430, air flow (illustrated as arrows 432) from air supply 416 can pressurize central air passage 414 to contract gripping plates 410 (illustrated as arrow 434).

Mounting body 412 includes one or more air passage inlets 436 (see FIGS. 11 and 16) that extend through cylindrical surface 430. These inlets 436 are positioned axially between seal tubes 426, 428.

The seal tubes 426, 428 are carried in a pair of cylindrical grooves 438, 440 formed in an inner surface 442 of the seal collar 420. A second pneumatic fitting 444 is mounted to the seal collar 420 and is operably coupled to a second air supply 446. Both seal tubes 426, 428 are fluidly coupled to pneumatic fitting 444 such that a single air supply fills both seal tubes 426, 428.

In other embodiments, the first and second air supplies 416, 446 can be provided by a same air supply and need not be separate.

When it is desired to pressurize central air passage 414, air is supplied through second pneumatic fitting 444 from air supply 446 into seal tubes 426, 428. With the air passage inlets 436 positioned between the seal tubes 426, 428, when the seal tubes 426, 428 are inflated the air passage inlets are sealed such that air flow passage 414 can be pressurized.

When the seal tubes 426, 428 are deflated, the seal tubes 426, 428 do not engage cylindrical surface 430 or if they do they provide substantially no resistance to rotation of the mounting body 412 about axis 404. By eliminating friction, less powerful motors can be used. Further, by eliminating this friction, more accurate control of the tension on the tows being dispensed therefrom or rewound thereon can be experienced.

Further, when the seal tubs 426, 428 are deflated, the seal between pneumatic fitting 444 and air inlet 436 is broken such that air within air passage 414 is released.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fiber delivery apparatus for the manufacture of composite fiber laminated products comprising:
an articulating wrist apparatus including first and second wrist elements operably coupled to one another for pivotable movement therebetween about a wrist axis;
a creel assembly storing a plurality of fiber spools therein, the first wrist element in a fixed axial position relative to the creel assembly such that the wrist axis remains in a fixed axial position relative to the creel assembly;
a fiber placement head mounted to the second wrist element for pivotal movement about the wrist axis relative to creel assembly, a tow path being formed between each of the plurality of spools and the fiber placement head; and
further including a pivot angle redirect arrangement mounted to the second wrist element and is positioned along the tow paths between the spools and the fiber placement head.

2. The fiber delivery apparatus of claim 1, wherein the pivot angle redirect arrangement is offset from the wrist axis along the tow paths between the wrist axis and the spools.

3. The fiber delivery apparatus of claim 1, further including a coupling for connecting the fiber delivery apparatus to a positioner system, the coupling being axially positioned between the creel assembly and the fiber placement head, the coupling being laterally offset from the creel assembly.

4. The fiber delivery apparatus of claim 1, further including a coupling for connecting the fiber delivery apparatus to a positioner system, the coupling being axially positioned proximate a distal end of the fiber delivery apparatus, the creel assembly being substantially positioned axially between the coupling and the fiber placement head.

5. The fiber delivery apparatus of claim 1, wherein the fiber placement head is pivotally coupled to the second wrist element for rotation about a head axis that is perpendicular to the wrist axis.

6. The fiber delivery apparatus of claim 5, wherein the spools of the creel assembly form a unit of spools coupled to one another, the unit of spools rotating about a tree axis that is generally perpendicular to the wrist axis.

7. The fiber delivery apparatus of claim 6, wherein the unit of spools and the articulating wrist apparatus both rotate about the tree axis.

8. The fiber delivery apparatus of claim 1, wherein the pivot angle redirect arrangement is mounted solely to the second wrist element.

9. A fiber delivery apparatus for the manufacture of composite fiber laminated products comprising:
an articulating wrist apparatus including first and second wrist elements operably coupled to one another for pivotable movement therebetween about a wrist axis;
a creel assembly storing a plurality of fiber spools therein, the first wrist element in a fixed axial position relative to the creel assembly such that the wrist axis remains in a fixed axial position relative to the creel assembly;
a fiber placement head mounted to the second wrist element for pivotal movement about the wrist axis relative to creel assembly, a tow path being formed between each of the plurality of spools and the fiber placement head;
further including a pivot angle redirect arrangement mounted to the second wrist element and is positioned along the tow paths between the spools and the fiber placement head;
wherein the pivot angle redirect arrangement is offset from the wrist axis along the tow paths between the wrist axis and the spools; and
wherein the pivot angle redirect arrangement pivots about a pivot angle redirect axis relative to the second wrist axis at a rate that is less than the rate that the second wrist element pivots relative to the first wrist element about the wrist axis.

10. A fiber delivery apparatus for the manufacture of composite fiber laminated products comprising:
an articulating wrist apparatus including first and second wrist elements operably coupled to one another for pivotable movement therebetween about a wrist axis;
a creel assembly storing a plurality of fiber spools therein, the first wrist element in a fixed axial position relative to the creel assembly such that the wrist axis remains in a fixed axial position relative to the creel assembly;
a fiber placement head mounted to the second wrist element for pivotal movement about the wrist axis relative to creel assembly, a tow path being formed between each of the plurality of spools and the fiber placement head;
further including a pivot angle redirect arrangement mounted to the second wrist element and is positioned along the tow paths between the spools and the fiber placement head,
wherein the pivot angle redirect arrangement is offset from the wrist axis along the tow paths between the wrist axis and the spools; and
wherein the offset between the wrist axis and the pivot angle redirect arrangement is such that when the second wrist element pivots relative to the first wrist element a maximum angle the overall length of each tow path does not increase by more than a diameter of the spools.

11. A fiber placement system including:
a positioner system; and
a fiber delivery apparatus coupled to the positioner system, the fiber delivery apparatus comprising:
an articulating wrist apparatus including first and second wrist elements operably coupled to one another for pivotable movement therebetween about a wrist axis;
a creel assembly storing a plurality of fiber spools therein, the first wrist element in a fixed axial position relative to the creel assembly such that the wrist axis remains in a fixed axial position relative to the creel assembly;
a fiber placement head mounted to the second wrist element for pivotal movement about the wrist axis relative to creel assembly, a tow path being formed between each of the plurality of spools and the fiber placement head;
a mechanical interface releasably coupling the positioner system to the fiber delivery apparatus; and
a pivot angle redirect arrangement mounted to the second wrist element being positioned along the tow paths between the spools and the fiber placement head.

12. The fiber placement system of claim 11, wherein the positioner system is a gantry system that provides only linear degrees of freedom and the fiber delivery apparatus is substantially free of linear degrees of freedom between the fiber spools and the fiber placement head.

13. The fiber placement system of claim 12, wherein the fiber delivery apparatus includes a laterally extending coupling portion that forms a portion of the mechanical interface, the positioner system includes vertical ram, the vertical ram coupling to the laterally extending coupling portion such that both the vertical ram and the creel assembly are on a same side of the laterally extending coupling portion and the fiber placement head is on an opposite side of the laterally extending coupling portion.

14. The fiber placement system of claim 11, further comprising a positioning controller and a fiber placement controller that is separate from the positioning controller, the fiber placement controller is carried in the fiber delivery apparatus such that when the fiber delivery apparatus is disconnected from the gantry the fiber placement controller remains with the fiber delivery apparatus, the positioning controller is external to the fiber delivery apparatus and remains with the positioner system, the fiber spools having fiber tows thereon, the positioning controller controls all positional operations for positioning the fiber placement head during fiber placement operations, the fiber placement controller controls all fiber placement operations performed by the fiber delivery apparatus to the fiber tows during fiber placement operations.

* * * * *